US009832937B2

(12) United States Patent
Schroeder

(10) Patent No.: US 9,832,937 B2
(45) Date of Patent: Dec. 5, 2017

(54) TRIMMER

(71) Applicant: Barry Schroeder, Payette, ID (US)

(72) Inventor: Barry Schroeder, Payette, ID (US)

( * ) Notice: Subject to any disclaimer, the term of this patent is extended or adjusted under 35 U.S.C. 154(b) by 650 days.

(21) Appl. No.: 14/461,287

(22) Filed: Aug. 15, 2014

(65) Prior Publication Data

US 2015/0047485 A1 Feb. 19, 2015

Related U.S. Application Data

(60) Provisional application No. 61/866,860, filed on Aug. 16, 2013.

(51) Int. Cl.
| | | |
|---|---|---|
| *B23D 15/06* | (2006.01) | |
| *B26D 7/00* | (2006.01) | |
| *A01G 5/00* | (2006.01) | |
| *A23N 15/06* | (2006.01) | |
| *B26D 1/06* | (2006.01) | |
| *B26B 19/04* | (2006.01) | |
| *B26B 19/28* | (2006.01) | |
| *B26B 19/38* | (2006.01) | |
| *B26F 1/44* | (2006.01) | |

(52) U.S. Cl.
CPC ............... *A01G 5/00* (2013.01); *A23N 15/06* (2013.01); *B26B 19/042* (2013.01); *B26B 19/28* (2013.01); *B26B 19/384* (2013.01); *B26B 19/3846* (2013.01); *B26D 1/06* (2013.01); *B26D 1/065* (2013.01); *B26D 7/00* (2013.01); *A01G 2005/005* (2013.01); *B26D 2007/0018* (2013.01); *B26F 2001/449* (2013.01); *Y10T 83/2081* (2015.04); *Y10T 83/222* (2015.04); *Y10T 83/412* (2015.04)

(58) Field of Classification Search
CPC ........ A01G 5/00; A23N 15/06; B26B 19/042; B26B 19/28; B26B 19/384; B26B 19/3846; B26D 1/06; B26D 1/065; B26D 7/00; Y10T 83/2081; Y10T 83/222
USPC ................ 83/932, 356.2, 356.3, 198; 99/537
See application file for complete search history.

(56) References Cited

U.S. PATENT DOCUMENTS

| | | | | | |
|---|---|---|---|---|---|
| 3,106,173 | A | * | 10/1963 | Harris | ...................... A21C 5/00 137/614.21 |
| 4,850,845 | A | * | 7/1989 | Hicks | ..................... A21C 11/10 425/289 |
| 4,928,893 | A | * | 5/1990 | Prindle | ................... A47J 43/25 241/100 |

(Continued)

*Primary Examiner* — Omar Flores Sanchez

(57) ABSTRACT

A device for trimming stems and the leafy plant structure projecting from a flower of a plant, for example a harvested flower of a marijuana plant. The device includes a blade head for supporting a pair of sheet blades, each sheet blade having a contact surface, the contact surface of the first sheet blade configured for reciprocating motion against the contact surface of the second. The first sheet blade and the second sheet blade are formed having numerous trimming apertures such that as the first sheet blade reciprocates against the second sheet blade, the plurality of first sheet blade trimming apertures and the plurality of second sheet aperture alternately, and at last partially, align and close creating a shearing action between the edges defining each of the plurality of first sheet blade trimming apertures and an edge defining each of the plurality of second sheet blade trimming apertures.

18 Claims, 8 Drawing Sheets

(56) References Cited

U.S. PATENT DOCUMENTS 5,445,332 A * 8/1995 Shimizu ................ A47J 43/082
                                                       241/100
5,765,472 A * 6/1998 Kim ....................... B26D 3/283
                                                        83/167

* cited by examiner

TRIMMER

This application claims the benefit of U.S. Provisional Application No. 61/866,860, entitled Trimmer, filed Aug. 16, 2013.

BACKGROUND OF THE INVENTION

Field of the Invention

The present invention relates to devices and methods for treating vegetable products and more particularly a device and method for trimming unwanted vegetative growth from a harvested flower.

Background

The flowering portion of a number of plants are harvested and employed for a variety of purposes, teas, infusions, vapors and smoking materials. Among these are the flowers of the marijuana plant. It is estimated that marijuana has been used by man since 3000 B.C. The plant has been used for medicinal, religious, spiritual and recreational purposes.

The expanding legalization and decriminalization of the use of marijuana has contributed to the growth of markets for the product as well as the development of more sophisticated producers, sellers and consumers. This sophistication has become evident is in the preferences expressed by dispensaries, sellers and buyers for increased control in the selection of plant genetics, methods for plant cultivation and uniformity in the presentation of the product.

Control of the plant genetics is deemed important if not essential as different strains of the plant are said to provide relief for different medically recognize maladies or conditions. Control of plant cultivation is deemed important as sophisticated sellers and consumers want to know "where" the product came from, that is, what type of media the plant was grown whether and what kinds of fertilizers were used in plant growth and whether and what kinds of other chemicals may have been used in the process of controlling the plant growth environment. Control in the uniformity and presentation of the product is deemed important as consumers of the product are interested in utilizing the flower or the "buds" of the plant as opposed to leaves of the plant, which exhibit a higher level of chlorophyll resulting in an undesirable harsh or even bitter taste when smoked. It is considered desirable then to remove leafy growth, to the extent that a user desires to eliminate the harshness associated with smoking leaf.

The marijuana plant is structurally typical in the sense that the plant includes a stalk from which numerous stems branch out, and branch out again. The flower of the marijuana plant is a compound flower including multiple sepals emanating from a single stem, surrounding and wrapping around the stem. Each flower includes multiple sepals that form a whorl that enclose the petals of a flower. Collectively, the multitude of sepals is referred to as the calyx. The calyx then forms the "flower" part of the female marijuana plant. The flower of the marijuana plant is formed of multiple "buds" formed at the base of each stem or sub-stem. As the calyx grows, leaf and the phyllary of the flower structure, in effect a plurality of modified leaves may extend from the bud. Most if not all dispensaries as well as a vast majority of sellers and buyers of marijuana prefer to purchase only those buds separated from the main stalk and other buds and having the described leafy structure removed from the buds.

To date, removal of the buds from the main stem and the sub-stems and removal of unwanted leafy structure from the buds has been effected manually by shearing each leaf extending from a bud with a pair of scissors. With an estimated annual production of 22 million pounds in the United States alone, the task of separating buds from stems and shearing unwanted leafage by hand has become ominous. It would be desirable to provide a device and method that would expedite the process of leaf and stem removal and shaping of the bud.

An object of the present invention is to provide a device and method that would expedite the process of leaf and stem removal from the harvested flowers of the marijuana plant.

SUMMARY OF THE INVENTION

The present invention is directed to a device for removing stems and the leafy plant structure projecting from the flower of a harvested plant. More particularly, the present invention is directed to device shearing the leafy plant structure projecting from the flower of a harvested marijuana plant. According to the present invention stems, leafy structure and other unwanted vegetative structure are removed by means of a mechanical shear. The present invention is also directed to a method for removing by shearing the leafy plant structure projecting from the flower of a harvested plant, and more particularly to method for removing stems and leafy plant structure projecting from the flower of a harvested marijuana plant.

In a preferred embodiment of the invention, the device includes a blade head configured to support a first sheet blade and a second sheet blade, the first sheet blade having a first blade contact surface and the second sheet blade having a second blade contact surface, the first blade contact surface configured for reciprocating motion against the second blade contact surface. The first sheet blade also includes a plurality of first sheet blade trimming apertures and the second sheet blade includes a plurality of second sheet blade trimming apertures, the first sheet blade trimming apertures and the second sheet blade trimming apertures being located so that as the first sheet blade reciprocates against the second sheet blade, the first sheet aperture and the second sheet aperture alternately, and at last partially, align and close creating a shearing action between an edge defining the first sheet aperture and an edge defining the second sheet aperture. Material placed against the alternately opening and closing shear action is trimmed at a plane defined by the interface between the first blade contact surface and the second blade contact surface.

In the preferred embodiment, the first sheet blade and the second sheet blade are each formed having a curving contact surface such that the curving contact surface of the first sheet blade corresponds to the curving contact surface of the second sheet blade. The curve is formed about an axis that lies substantially parallel to a line that lies along a direction of the reciprocating motion of the first sheet blade and the second sheet blade with respect to each other. Trimming may be performed on the device with the blades presenting either a concave curving work surface or in the alternative against a convex curving work surface as each configuration has its advantages.

Additionally, the device preferably includes a stem chopper adapted to sever the individual buds from the main stem or smaller sub-stems. The stem chopper includes a first substantially circular aperture formed in a stationary first sheet blade, the substantially circular first aperture sized to accept the insertion of the stem of the flower. A second aperture is formed in a reciprocating second sheet blade, the location of the second aperture corresponding generally with the location of the substantially circular first aperture. As the contact surface of the second sheet blade reciprocates against a contact surface of the first sheet blade, a shearing action is caused at the interface of the first and second sheet blades and a stem inserted through the apertures is consequentially sheared.

In the preferred embodiment, the first sheet blade and the second sheet blade are each formed of food grade stainless steel sheet metal having a thickness in the range of 0.0122 inches to 0.060, and in one preferred embodiment, the blades are formed of 22 gauge sheet metal. Also, in the preferred embodiment, the first sheet blade and the second sheet blade are each formed having a plurality of sheet trimming apertures such that as the first sheet blade reciprocates with respect to the second sheet blade, the plurality of first sheet blade trimming apertures and the plurality of second sheet apertures alternately, and at least partially, align and close creating a shearing action between the edges defining each of the plurality of first sheet blade trimming apertures and an edge defining each of the plurality of second sheet blade trimming apertures. Preferably, the plurality of trimming apertures formed on the first sheet blade are all formed having a longitudinal axis that lies substantially perpendicular to a side edge of the first sheet blade. Similarly, the plurality of trimming apertures formed on the second sheet blade are all formed having a longitudinal axis that lies obliquely to a side edge of the second sheet blade, and therefore the trimming apertures also lie obliquely to the longitudinal axis of each of the plurality of trimming apertures formed on the first sheet blade, when the sheet blades are placed in the a blade head. This configuration permits a progressive shearing action between the edges defining the plurality of first sheet blade trimming apertures and the plurality of second sheet blade trimming apertures as they reciprocate back and forth one over the other.

An electric motor is operatively connected to a least one of the first or second sheet blades and is coupled and configured to provide a reciprocating motion of the sheet blade to which it is attached. The reciprocating motion occurs along an axis that lies parallel to a side edge of the sheet blade. Alternately an electric motor may be operatively connected each of the first sheet blade and the second sheet blade to provide a reciprocating motion between the first and second sheet blades. A control device provides for adjustment of the motor speed and thereby the speed of the relative reciprocation of the first sheet blade to the second sheet blade.

In one embodiment, the lateral edges of a stationary first sheet blade are fixed to the blade head and the lateral edges of a second reciprocating sheet blade are carried by a plurality of bearings mounted along either of the sides of the blade head. In a preferred embodiment, a curved contact surface of each of the pair of sheet blades are formed having substantially the same profile so as to provide a sliding interface between the pair of sheet blade surfaces.

Additionally, in a preferred embodiment, the trimmer includes an enclosure adapted to catch and collect trimmed material. In one embodiment the enclosure is configured as a five-sided rectangular box adapted to permit the mounting of the blade head with its first and second sheet blades, together with the connected motor, linkage and motor control atop an upper facing open side of the box. With this configuration, as material is trimmed from the buds, the trimmings fall into the enclosure and may be readily retrieved. One or more screens may be places within the box to facilitate sorting of fines from the bulkier leaf material.

Additionally, the device may include a tray located about at least a portion of the periphery of the blade head to catch and collect trimmed buds.

In a preferred embodiment of the invention, all of the metal parts of the head, blades and enclosure are formed of food grade materials, for instance food grade stainless steel.

In use, flower buds are placed on an upper curving surface of the upper sheet blade. As the sheet blade reciprocates with respect to one another, flower buds are rolled in a random pattern across the curving surface of the uppermost sheet blade. A slight pressure is exerted against the flower buds sufficient to keep a surface of the flower bud in contact with the face of the sheet blade. This may be achieved by hand, exerting a slight pressure against the buds using a palm of a hand and seeing that all surfaces of the flower bud is exposed to the shearing action of the sheet blades during the process. In the alternative, a paddle, trowel or other tool or other mechanical device may be employed to impart a rolling motion to the flower bud. As the bud is moved across the surface of the upper sheet blade, leaf and other non-uniform growth will project through a first sheet aperture and a second sheet aperture as they align. As the second sheet blade reciprocates the second sheet aperture will close with respect to the first sheet aperture creating a shearing action between an edge defining the first sheet aperture and an edge defining the second sheet aperture. Material projecting through the first sheet aperture beyond the contact surface of the first sheet blade is trimmed at a plane defined by the interface between the first blade contact surface and the second blade contact surface.

DETAILED DESCRIPTION

Figure 1:
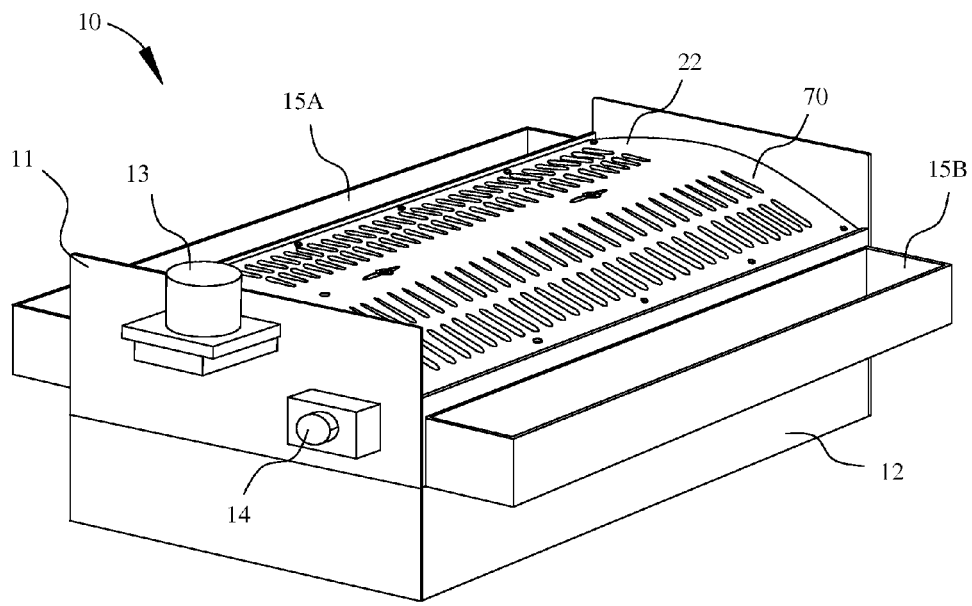
FIG. 1 is a representative perspective view of a trimming device according to the present invention.
Figure 2:
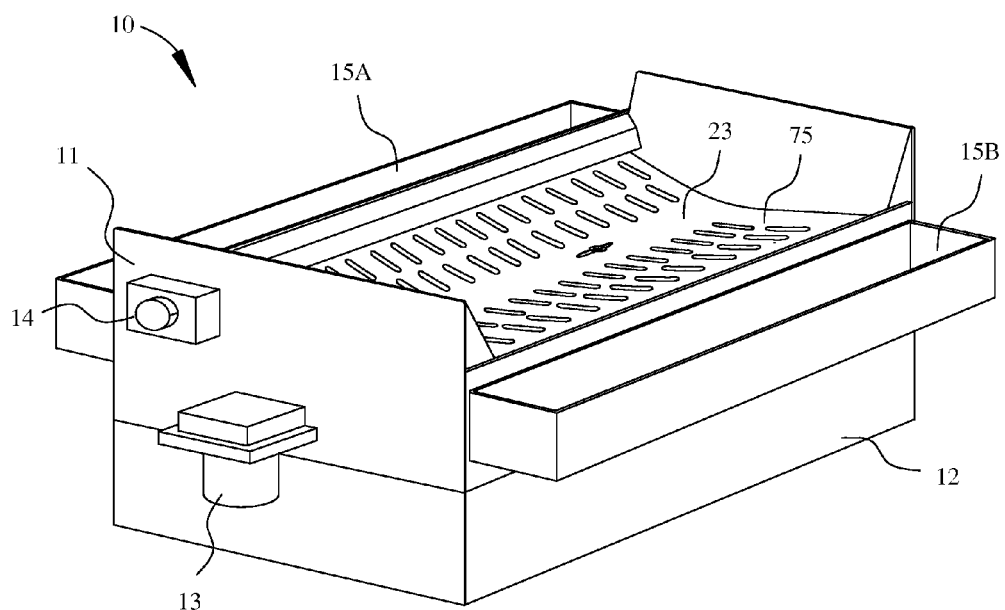
FIG. 2 is a representative end view of a trimming device according to the present invention.

Referring to FIGS. 1 through 5, trimmer 10 is shown including blade head 11 which is mounted atop blade head base 12. Motor 13 and motor control 14 are also shown attached to blade head 11. A pair of trimmed product trays 15A and 15B are attached to either side of blade head base 12. In FIG. 1, trimmer 10 is shown in a first configuration wherein blade head 11 is oriented such that convex surface 22 of first sheet blade 70 is presented as a convex trimming surface for trimming product. Referring to FIG. 2, trimmer 10 is shown in a second configuration wherein blade head 11 is oriented such that concave surface 23 of second sheet blade 75 is presented as a concave trimming surface for trimming product.

Figure 3:
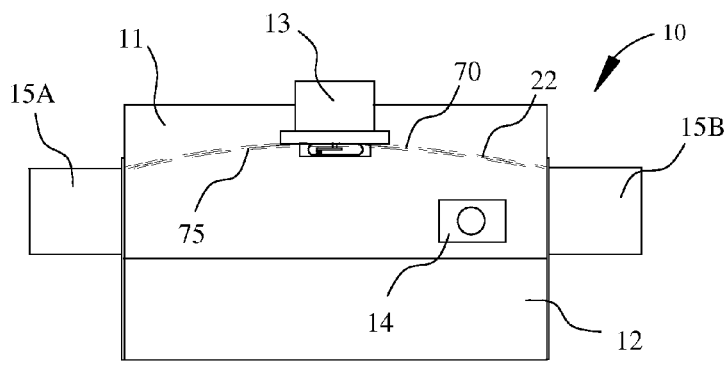
FIG. 3 is a representative end view of a trimming device according to the present invention.
Figure 4:
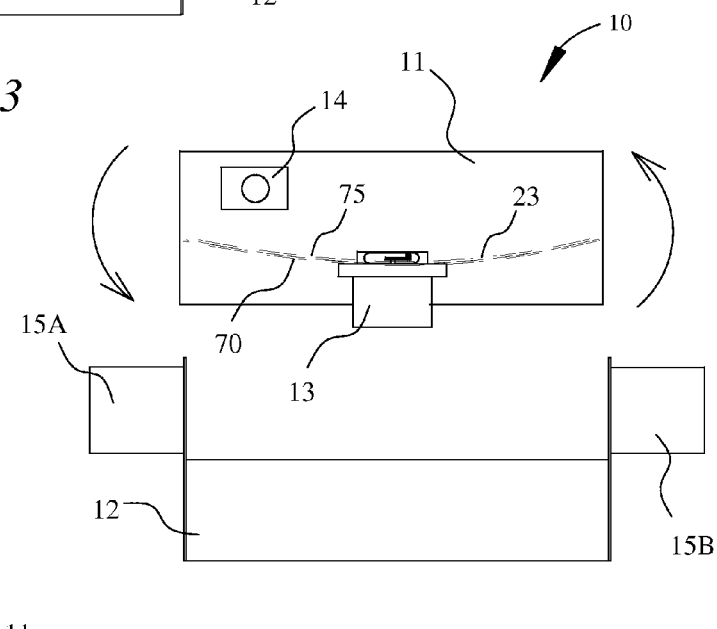
FIG. 4 is a representative end view of a trimming device according to the present invention.
Figure 5:
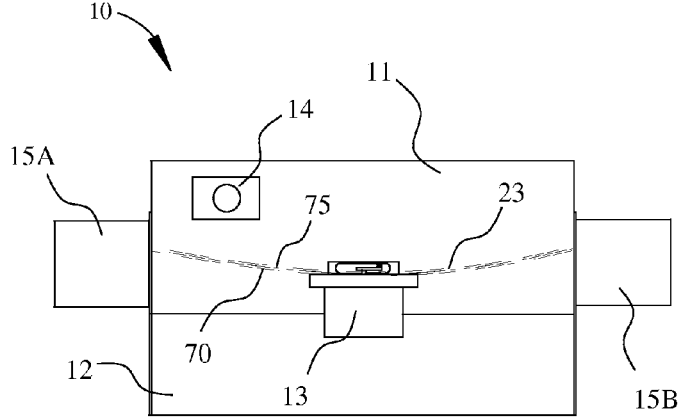
FIG. 5 is a representative end view of a trimming device according to the present invention.

FIGS. 3 through 5 illustrate further the feature of the invention wherein blade head 11 may be removed from blade head base 12 and rotated to present either convex surface 22 of first sheet blade 70, as seen in FIG. 3, or in the alternative, concave surface 23 of second sheet blade 75, as seen in FIG. 5, as a work surface for trimming product. The difference from an operational standpoint is really one of operator preference. Convex surface 22 as seen in FIGS. 1 and 3 provides a work surface wherein buds that have been trimmed have a tendency to roll outwardly toward trimmed product trays 15A or 15B, while the concave surface 23 as seen in FIGS. 2, 4 and 5 provides a work surface wherein buds that are not presently being trimmed have a tendency to roll towards the center of second sheet blade 75.

Figure 6:
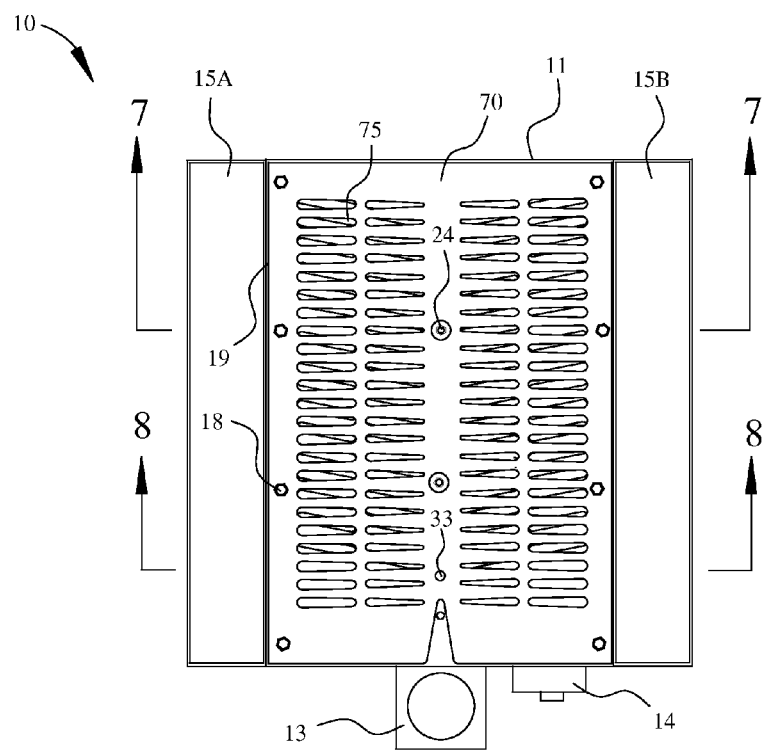
FIG. 6 is a representative top view of a trimming device according to the present invention.

FIG. 6 shows a top view of trimmer 10 including blade head 11 which is mounted atop blade head base 12. Motor 13 and motor control 14 are shown attached to blade head 11. A pair of trimmed product trays 15A and 15B are shown located to either side of blade head base 12. First sheet blade 70 is shown attached to blade head 11 by a plurality of blade retainer screws typified by blade retainer screw 18, fix marginal side edge 19 of first sheet blade 70 to blade head 11. A plurality of blade keeper screw assemblies typified by blade keeper screw assembly 24 assist in maintaining the sliding fit of first sheet blade 70 and second sheet blade 75. FIG. 6 also shows first sheet blade stem chopping aperture 33 located in first sheet blade 70.

Figure 7:
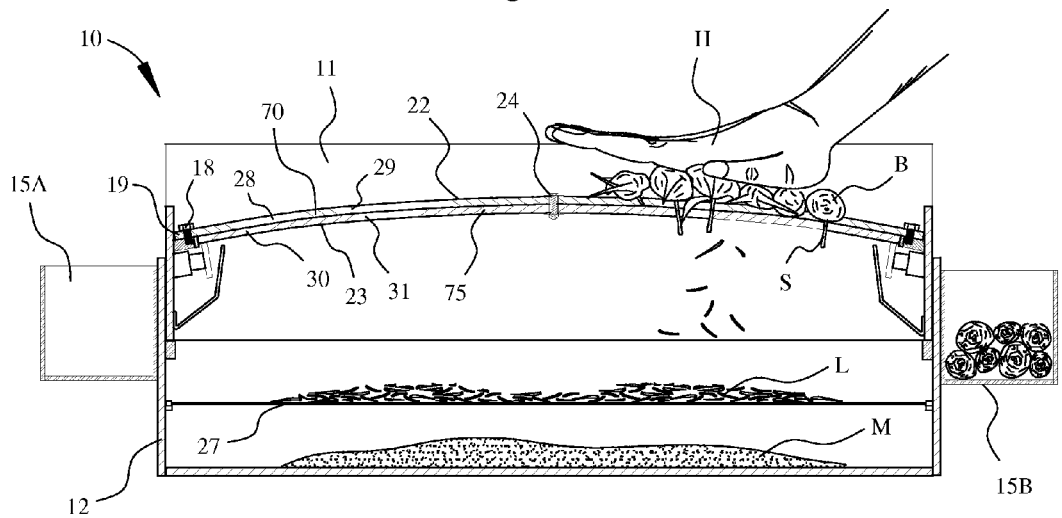
FIG. 7 is a representative end cutaway view of a trimming device according to the present invention.
Figure 8:
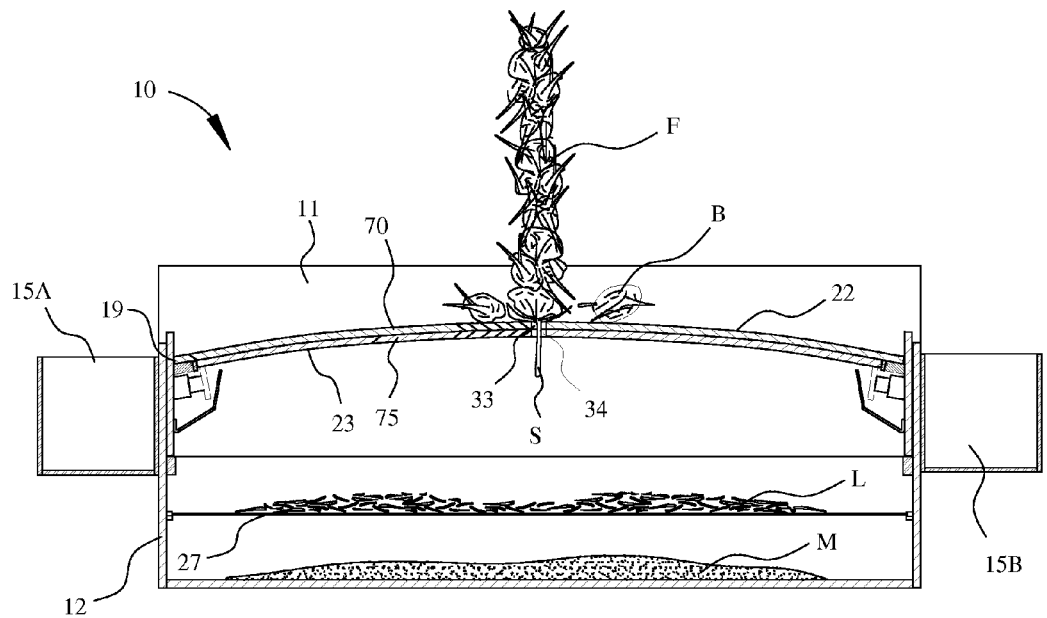
FIG. 8 is a representative end cutaway view of a trimming device according to the present invention.
Figure 9:
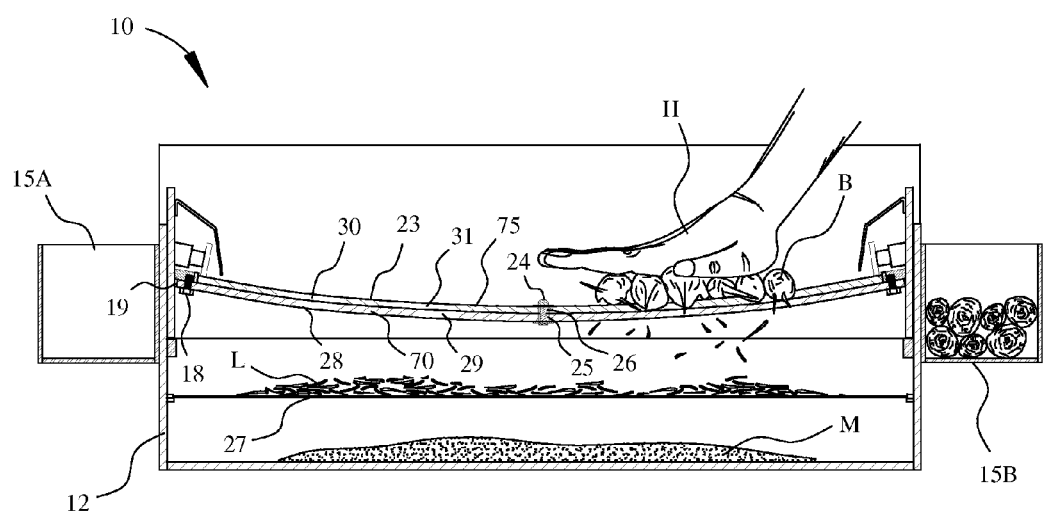
FIG. 9 is a representative end cutaway view of a trimming device according to the present invention.

FIGS. 7, 8 and 9 are representative end cutaway views of trimmer 10 showing blade head 11 mounted atop blade head base 12. A pair of trimmed product trays 15A and 15B are attached to either side of blade head base 12. In FIGS. 7 and 8, trimmer 10 is shown in a first configuration wherein blade head 11 is oriented such that convex surface 22 of first sheet blade 70 is presented as a work surface for trimming buds B. Referring to FIG. 9, trimmer 10 is shown in a second configuration wherein blade head 11 is oriented such that concave surface 23 of second sheet blade 75 is presented as a work surface for trimming bud B.

FIGS. 7 and 8 show first sheet blade 70 attached to blade head 11 by a plurality of blade retainer screws typified by blade retainer screw 18 which fix marginal side edge 19 of first sheet blade 70 to blade head 11. Blade keeper screw assembly 24 assists in maintaining the sliding fit of first sheet blade 70 and second sheet blade 75. FIGS. 7, 8 and 9 show roller bearing assembly 20 attached to blade head 11 and adapted to maintain a rolling pressure against second sheet blade 75.

As seen in FIGS. 7, 8 and 9, as leafage L and stems S project through the aligned trimming apertures and are subjected to the reciprocating action of second sheet blade 75 against the stationary fixed first sheet blade 70, said leafage L and stems are severed from the bud B and drops to mesh screen 27. Meshed fines M are separated further from leafage L and drop through mesh screen 27 to the bottom of blade head base 12 which is formed as a collection bin for trimmed product.

Referring to FIG. 7 first sheet blade 70 is formed having first sheet blade outer row trimming aperture 28 and first sheet blade inner row trimming aperture 29. Positioned below these respectively are second sheet blade outer row trimming aperture 30 and second sheet blade inner row trimming aperture 31 formed in second sheet blade 75. FIG. 7 shows a plurality of buds B being rolled across convex surface 22 by hand H.

FIG. 8 shows operation of the stem chopping feature of trimmer 10. The main stem S of flower F is inserted through first sheet blade stem chopping aperture 33 and as second sheet blade stem chopping aperture 34 aligns with first sheet blade stem chopping aperture 33 due to the reciprocating action of second sheet blade 75 against the stationary fixed first sheet blade 70, stem S is pushed on through second sheet blade stem chopping aperture 34 and is severed with the return motion of second sheet blade 75 against fixed first sheet blade 70. Stem S is thereby severed from flower F and as pressure is maintained pushing flower F against first sheet blade stem chopping aperture 33 the sub-stems attaching buds to flower F are severed and buds B are separated from flower F and the stem S drops to mesh screen 27.

FIG. 9 shows trimmer 10 configured with convex surface 23 of second sheet blade 75 positioned as the work surface, First sheet blade 70 is formed having first sheet blade outer row trimming aperture 28 and first sheet blade inner row trimming aperture 29. Positioned above these respectively are second sheet blade outer row trimming aperture 30 and second sheet blade inner row trimming aperture 31 formed in second sheet blade 75. FIG. 9 shows a plurality of buds B being rolled across cave surface 23 by hand H.

Figure 10:
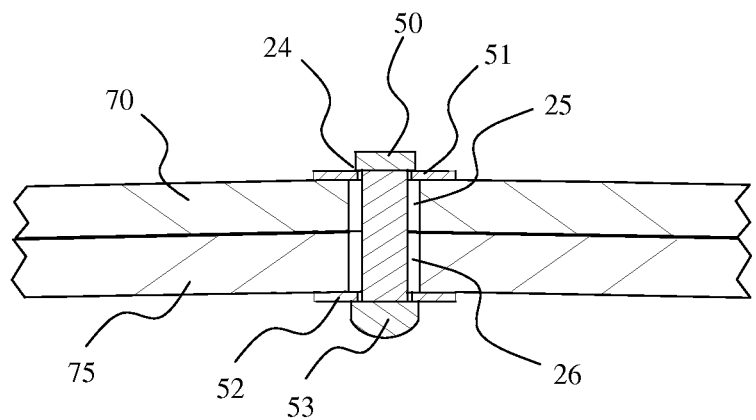
FIG. 10 is a representative end cutaway view showing a blade keeper screw assembly of a trimming device according to the present invention.

FIG. 10 is a detail cutaway showing blade keeper screw assembly 24 including machine screw 50, a pair of washers 51 and 52 and locking nut 53. Blade keeper screw assembly 24 is fixed through first sheet blade keeper screw aperture 25 and second sheet blade keeper screw slot 26 and is tightened to permit a sliding action between first sheet blade 70 and second sheet blade 75.

Figure 11:
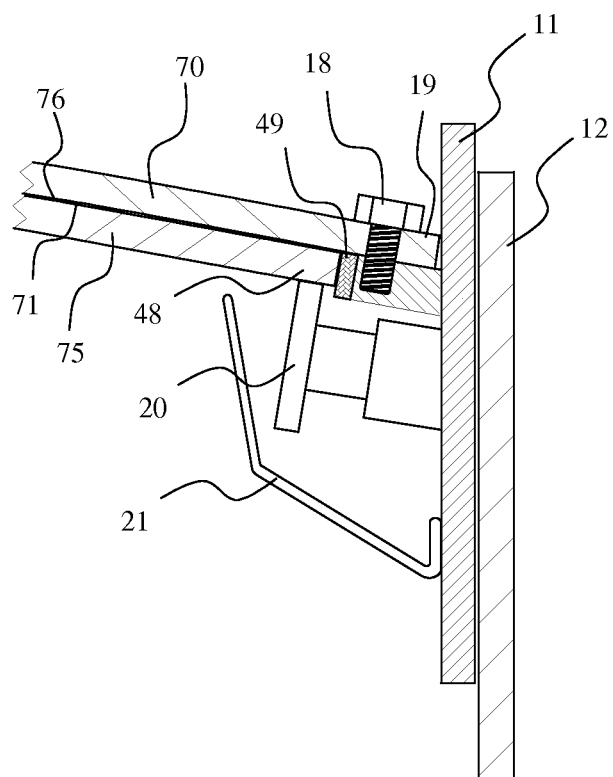
FIG. 11 is a representative end cutaway view showing attachment and support of the marginal edges of a first and second sheet blade of a trimming device according to the present invention.

FIG. 11 is a detail cutaway showing blade retainer screw 18 which fixes marginal side edge 19 of first sheet blade 70 to blade head 11. Also seen in FIG. 11 is roller bearing assembly 20 attached to blade head 11 and adapted to maintain a rolling pressure against second sheet blade 75 marginal edge 48. Polymeric glide 49 facilitates the reciprocating action of marginal edge 48 and eliminates potential for galling between metallic surfaces. Bearing guards are shown attached to blade head 11 and configured to reduce the probability of product interfering with operation of roller bearing assembly 20 as well as reducing the probability of contact with roller bearing assembly 20 by an operator during use.

FIG. 11 also shows the curving contact surfaces first sheet blade curving contact surface 71 and second sheet blade curving contact surface 76 which are formed having substantially the same radius such that a sliding interface is maintained between first sheet blade 70 second sheet blade 75. Blade keeper screw assembly 24, shown in FIG. 10 and the plurality of roller bearing assemblies located along the opposing marginal edges of second sheet blade 75 and typified by roller bearing assembly 20 seen in FIG. 11 assist in maintaining the sliding interface is maintained between first sheet blade 70 second sheet blade 75.

Figure 12:
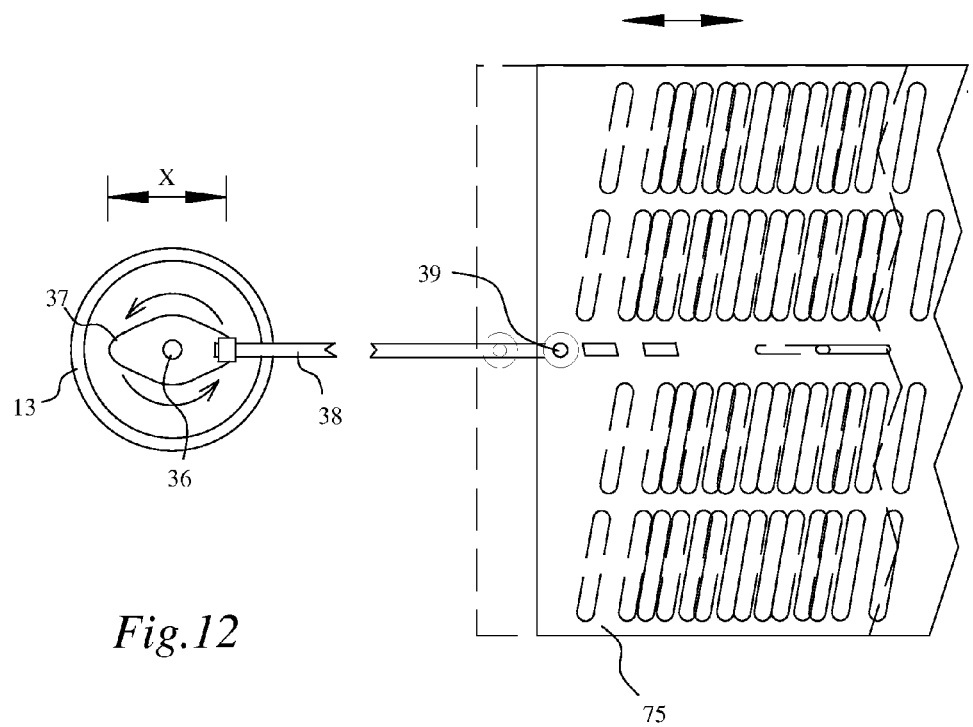
FIG. 12 is a representative view of a drive motor and drive linkage for a trimming device according to the present invention showing the reciprocating motion of a sheet blade with the operation of the drive motor.
Figure 13:
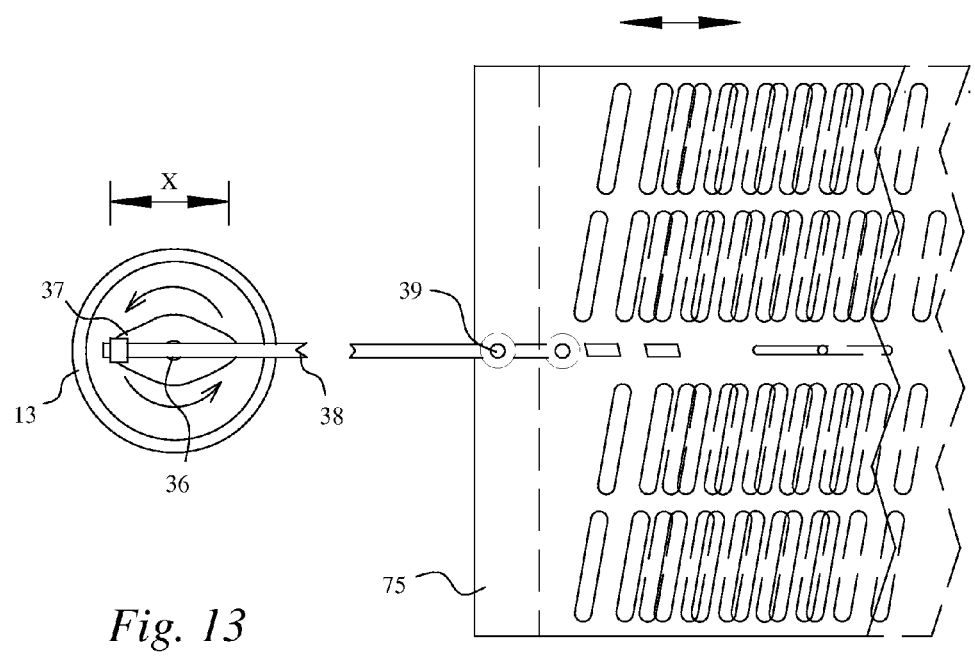
FIG. 13 is a representative bottom view of a drive motor and drive linkage for a trimming device according to the present invention showing the reciprocating motion of a sheet blade with the operation of the drive motor.

Referring to FIGS. 12 and 13, trimmer motor 13 is shown attached to second sheet blade 75 to provide a reciprocating action. Motor 13 is attached to second sheet blade 75 includes drive shaft 36 to which eccentric drive lug 37 is attached. Eccentric drive lug 37 rotates with drive shaft 36 and the attached drive linkage 38 moves thereby in a reciprocating motion traversing a distance X in both a forward and reverse direction. Linkage connector 39 attaches drive linkage 38 to second sheet blade 75 which also moves with operation of motor 14 with a reciprocating motion traversing a distance X in both a forward and reverse direction.

Figure 14:
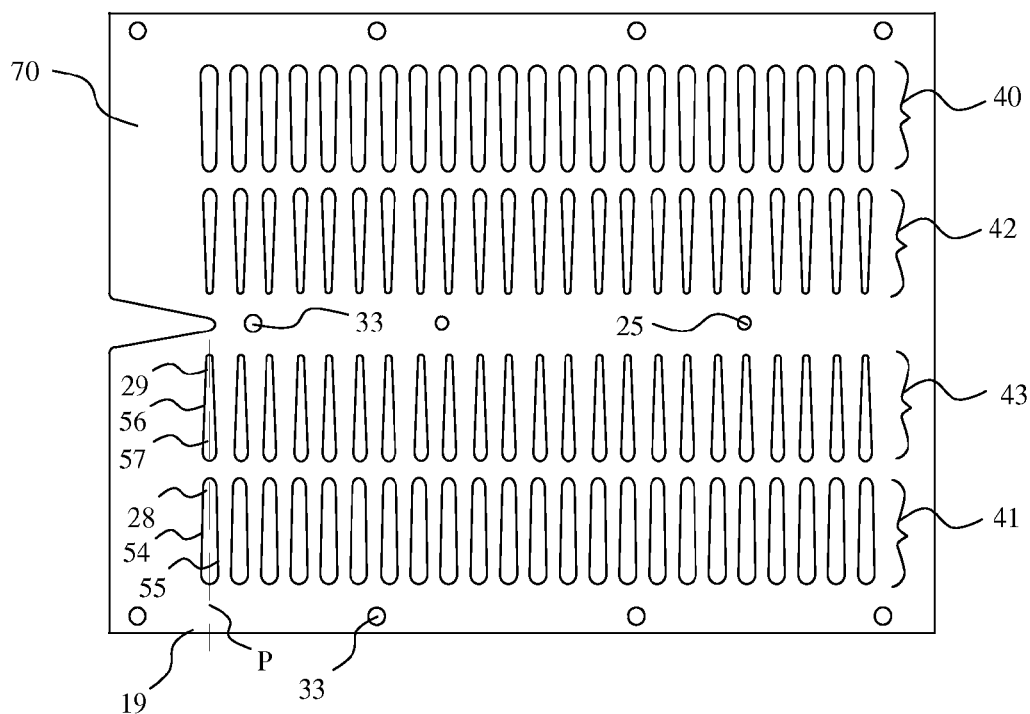
FIG. 14 is a representative top view of a first sheet blade for a trimming device according to the present invention.

FIG. 14 is a top view of first sheet blade 70 shown including first outer row 40 of tapered trimming apertures, second outer row 41 of tapered trimming apertures, first inner row 42 of tapered trimming apertures and second inner row 43 of tapered blade apertures. In the preferred embodiment of the invention, each of the first sheet blade outer row trimming apertures typified by first sheet blade outer row trimming aperture 28 which is formed so as to extend across a face of first sheet blade 70 on line P that lies substantially perpendicular to first sheet blade marginal edge 19.

Each of the first sheet blade outer row trimming apertures typified by first sheet blade outer row trimming aperture 28 has a tapered configuration that tapers from a width substantially equal to 0.375 inches to a width substantially equal to 0.0.250 inches. Similarly, each of the first sheet blade inner row trimming apertures typified by first sheet blade inner row trimming aperture 29 are formed so as to extend across a face of first sheet blade 70 on a line that lies substantially perpendicular to first sheet blade marginal edge 19. Each of the first sheet blade inner row trimming apertures typified by first sheet blade inner row trimming aperture 29 has a tapered configuration that tapers from a width substantially equal to 0.218 inches to a width substantially equal to 0.0.125 inches. While the first sheet blade trimming apertures are described above as tapered, the use of non-tapered trimming apertures are clearly anticipated as being within the scope of the present invention.

Each of the first sheet blade outer row trimming apertures typified by first sheet blade outer row trimming aperture 28 is further defined by an outer row tapered trimming aperture first shearing edge 54 and an outer row tapered trimming aperture second shearing edge 55. Similarly, each of the first sheet blade inner row trimming apertures typified by first sheet blade inner row trimming aperture 29 is further defined by an inner row tapered trimming aperture first shearing edge 56 and an inner row tapered trimming aperture second shearing edge 57.

FIG. 14 also shows first sheet blade 70 shown including a plurality of retainer screw apertures typified by retainer screw aperture 58 formed along the opposing marginal edges of first sheet blade 70 and adapted for insertion of a retaining screw (not shown). Also shown in FIG. 12 are a pair of sheet blade keeper screw apertures typified by first sheet blade keeper screw aperture 25. First sheet blade stem chopping aperture 33 is also seen formed through first sheet blade 70.

Figure 15:
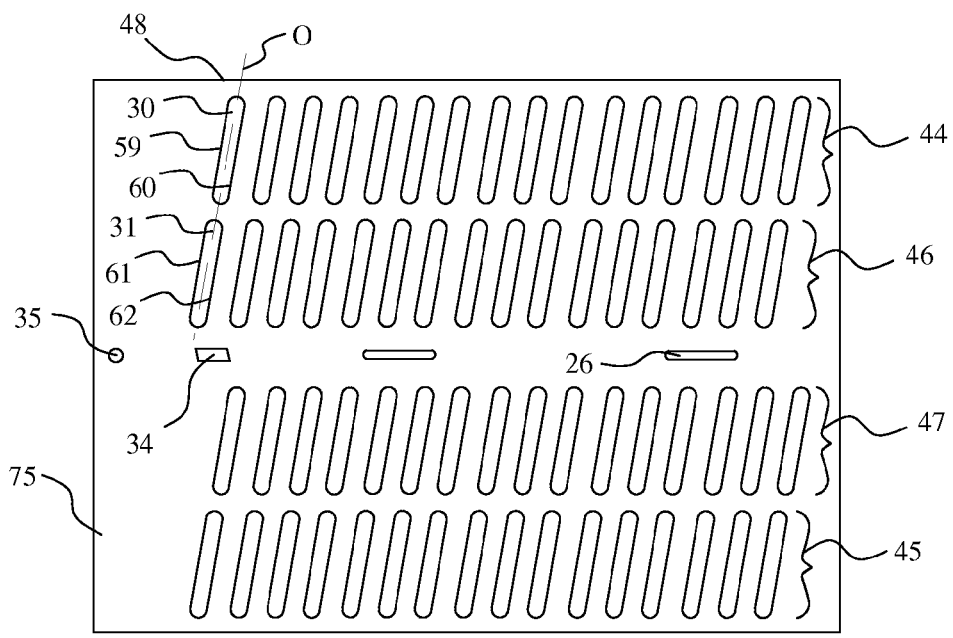
FIG. 15 is a representative top view of a second sheet blade for a trimming device according to the present invention.

Referring to FIG. 15, a top view of second sheet blade 75 is shown including first outer row oblique trimming apertures 44, second outer row oblique trimming apertures 45, first inner row oblique trimming apertures 46 and second inner row oblique trimming apertures 47. In the preferred embodiment of the invention, each of the oblique trimming apertures typified by second sheet blade outer row trimming aperture 30 and second sheet blade inner row trimming aperture 31 are formed so as to extend across a face of second sheet blade 75 on a line O that lies oblique to second sheet blade marginal edge 48.

Each of the outer row oblique trimming apertures typified by second sheet blade outer row trimming aperture 30 is further defined by an outer row oblique trimming aperture first shearing edge 59 and an outer row oblique trimming aperture second shearing edge 60. Similarly, each of the inner row oblique trimming apertures typified by second sheet blade inner row trimming aperture 31 is further defined by an inner row oblique trimming aperture first shearing edge 61 and an inner row oblique trimming aperture second shearing edge 62.

FIG. 15 also shows second sheet blade 75 including a plurality of sheet blade keeper screw slots typified by second sheet blade keeper screw slot 26. Second sheet blade stem chopping aperture 34 is also seen formed through second sheet blade 75.

Figure 16:
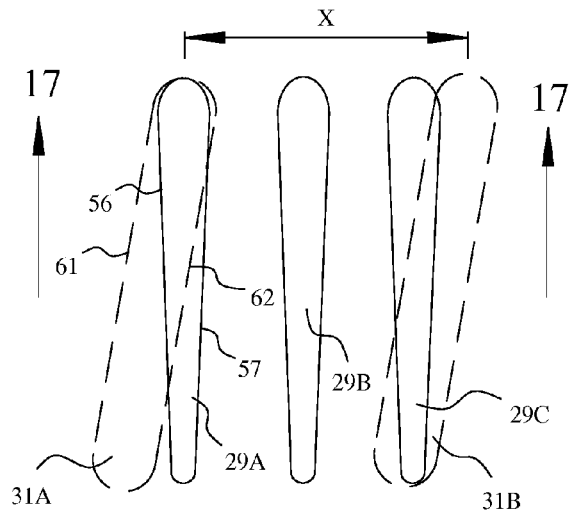
FIG. 16 is a representative top view showing the reciprocating shearing action between a plurality of first sheet blade trimming apertures and a plurality of second sheet blade trimming apertures.

FIG. 16 is a representative view showing the reciprocating shearing action between a plurality of first sheet blade trimming apertures 29A, 29b and 29C by and a plurality of second sheet blade trimming apertures 31A, 31B and 31C. With each forward stroke XF of the reciprocating action the plurality of second sheet blade trimming apertures 31A, 31B and 31C traverse a distance X. More particularly, and by way of illustration, with each forward stroke XF a shearing action is caused between inner row tapered trimming aperture second shearing edge 57 and inner row oblique trimming aperture first shearing edge 61. Similarly, with each reverse stroke XR of the reciprocating action the plurality of second sheet blade trimming apertures 31A, 31B and 31C traverse a distance X. More particularly, and again by way of illustration, with each reverse stroke XR a shearing action is caused between inner row tapered trimming aperture first shearing edge 56 and inner row oblique trimming aperture second shearing edge 62.

Figure 17:
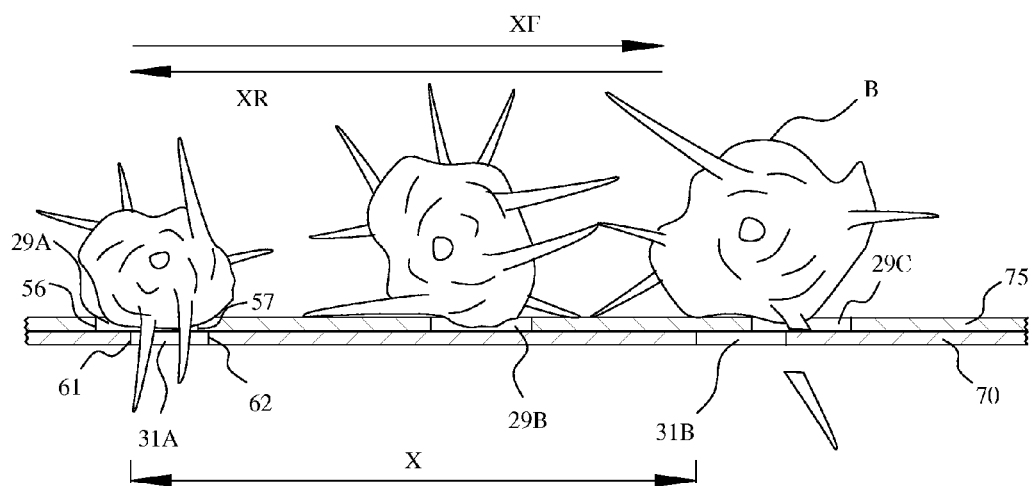
FIG. 17 is a representative side cutaway view of a first sheet blade and a second sheet blade according to the present invention showing the reciprocating shearing action between the edges defining the sheet trimming apertures.

FIG. 17 is a representative side cutaway view of first sheet blade 70 and second sheet blade 75 showing the reciprocating shearing action between a plurality of first sheet blade trimming apertures 29A, 29b and 29C by and a plurality of second sheet blade trimming apertures 31A, 31B and 31C. With each forward stroke XF of the reciprocating action between first sheet blade 70 and second sheet blade 75 the plurality of second sheet blade trimming apertures 31A, 31B and 31C traverse a distance X. More particularly, and by way of illustration, with each forward stroke XF a shearing action is caused between inner row tapered trimming aperture second shearing edge 57 and inner row oblique trimming aperture first shearing edge 61. Similarly, with each reverse stroke XR of the reciprocating action the plurality of second sheet blade trimming apertures 31A, 31B and 31C traverse a distance X. More particularly, and again by way of illustration, with each reverse stroke XR a shearing action is caused between inner row tapered trimming aperture first shearing edge 56 and inner row oblique trimming aperture second shearing edge 62.

The foregoing description of the illustrated embodiments has been presented for purposes of illustration and description. It is not intended to be exhaustive or to limit the invention to the precise form or to exemplary embodiment(s) and implementation(s) disclosed. Numerous modifications and variations will be apparent to practitioners skilled in this art. Elements described might be interchangeable with other elements in order to achieve the same result. At least one preferred embodiment was chosen and described in order to best explain the principles of the invention and a best mode of practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph unless the element is expressly recited using the phrase "means for . . . ."

What is claimed is:

1. A trimmer comprising:
   a blade head;
   a first sheet blade attached to the blade head, the first sheet blade having a curving first blade contact surface;
   a second sheet blade positioned in the blade head, the second sheet blade having a curving second blade contact surface, the curving second blade contact surface configured for a reciprocating motion against the curving first blade contact surface;
   a motor attached to the blade head, the motor operatively attached to at least one of the first sheet blade or the second sheet blade, the motor being further configured to provide the reciprocating motion between the first sheet blade and the second sheet blade;
   a plurality of first sheet blade trimming apertures formed through the first sheet blade;
   a plurality of second sheet blade trimming apertures formed through the second sheet blade such that as the first sheet blade reciprocates against the second sheet blade, the plurality of first sheet blade trimming apertures and the plurality of second sheet blade trimming apertures alternately open and close creating a shearing action between an edge defining in part each of the plurality of first sheet blade trimming apertures and an edge defining in part each of the plurality of second sheet blade trimming apertures.

2. The trimmer of claim 1 further comprising:
   each of the plurality of first sheet blade trimming apertures formed through the first sheet blade further comprise a tapering configuration and each of the plurality of first sheet blade trimming apertures being formed along a line that lies substantially perpendicular to a marginal side edge of the first sheet blade; and
   each of the plurality of second sheet blade trimming apertures are each formed along a line that lies oblique to a marginal side edge of the second sheet blade.

3. The trimmer of claim 1 further comprising a blade head base configured as a trimmed product catch bin adapted to catch and collect trimmed material.

4. The trimmer of claim 1 further comprising:
   a blade head base configured as a trimmed product catch bin adapted to catch and collect trimmed material; and
   a mesh screen positioned within the blade head base, the mesh screen configured to separate fines from trimmed leafage.

5. The trimmer of claim 1 further comprising a motor control for controlling an output speed of the motor and thereby controlling a speed at which the reciprocating motion between the first sheet blade and the second sheet blade.

6. The trimmer of claim 1 wherein the blade head further comprises a blade head configured to provide a first trimming configuration wherein the first sheet blade includes a concave surface and the first sheet blade is positioned above the second sheet blade to provide a concave trimming surface.

7. The trimmer of claim 1 further comprising:
   the first sheet blade including a first sheet blade stem chopping aperture; and
   the second sheet blade including a second sheet blade stem chopping aperture, the first sheet blade stem chopping aperture and the second sheet blade stem chopping aperture configured to alternately align and displace with reciprocating action of second sheet blade against the stationary fixed first sheet blade, such that a stem that is inserted through the first sheet blade stem chopping aperture and the second sheet blade stem chopping aperture when aligned will be chopped when the first sheet blade stem chopping aperture and the second sheet blade stem chopping aperture displace with the reciprocating action of second sheet blade against the stationary fixed first sheet blade.

8. A trimmer comprising:
   a blade head base configured as a trimmed product catch bin adapted to catch and collect trimmed material;
   a blade head adapted for attachment to the blade head base;
   a first sheet blade attached to the blade head, the first sheet blade having a first blade contact surface;
   a second sheet blade positioned in the blade head, the second sheet blade having a second blade contact surface, the second blade contact surface configured for a reciprocating motion against the first blade contact surface;
   a motor attached to the blade head, the motor operatively attached to at least one of the first sheet blade or the second sheet blade, the motor being further adapted to provide the reciprocating motion between the first sheet blade and the second sheet blade;
   a plurality of tapering first sheet blade trimming apertures formed through the first sheet blade;
   a plurality of second sheet blade trimming apertures formed through the second sheet blade such that as the first sheet blade reciprocates against the second sheet blade, the plurality of first sheet blade trimming apertures and the plurality of second sheet blade trimming apertures alternately open and close creating a shearing action between an edge defining in part each of the plurality of first sheet blade trimming apertures and an edge defining in part each of the plurality of second sheet blade trimming apertures.

9. The trimmer of claim 8 further comprising:
   the first sheet blade formed having a curving contact surface; and
   the second sheet blade formed having a curving contact surface such that a sliding interface exists between the curving contact surface of the first sheet blade and the curving contact surface of the second sheet blade.

10. The trimmer of claim 8 wherein the blade head base further comprises a mesh screen positioned within the blade head base, the mesh screen configured to separate fines from trimmed leafage.

11. The trimmer of claim 8 further comprising a motor control for controlling an output speed of the motor and thereby controlling a speed at which the reciprocating motion between the first sheet blade and the second sheet blade.

12. The trimmer of claim 8 wherein the blade head further comprises a blade head configured to provide a first trimming configuration wherein the first sheet blade includes a concave surface and the first sheet blade is positioned above the second sheet blade to provide a concave trimming surface.

13. The trimmer of claim 8 further comprising:
the first sheet blade including a first sheet blade stem chopping aperture; and
the second sheet blade including a second sheet blade stem chopping aperture, the first sheet blade stem chopping aperture and the second sheet blade stem chopping aperture configured to alternately align and displace with reciprocating action of second sheet blade against the stationary fixed first sheet blade, such that a stem that is inserted through the first sheet blade stem chopping aperture and the second sheet blade stem chopping aperture when aligned will be chopped when the first sheet blade stem chopping aperture and the second sheet blade stem chopping aperture displace with the reciprocating action of second sheet blade against the stationary fixed first sheet blade.

14. A trimmer comprising:
a blade head base configured as a trimmed product catch bin adapted to catch and collect trimmed material;
a blade head adapted for attachment to the blade head base;
a first sheet blade attached to the blade head, the first sheet blade having a curving contact surface;
a second sheet blade positioned in the blade head, the second sheet blade having a curving contact surface, the curving contact surface of the second sheet blade configured for a reciprocating motion against the first sheet blade contact surface such that a sliding interface exists between the curving contact surface of the first sheet blade and the curving contact surface of the second sheet blade;
a motor attached to the blade head, the motor operatively attached to at least one of the first sheet blade or the second sheet blade, the motor being further adapted to provide the reciprocating motion between the first sheet blade and the second sheet blade;
a plurality of tapering first sheet blade trimming apertures formed through the first sheet blade, each of the plurality of first sheet blade trimming apertures formed through the first sheet blade being formed along a line that lies substantially perpendicular to a marginal side edge of the first sheet blade;
a plurality of second sheet blade trimming apertures formed through the second sheet blade, each of the plurality of second sheet blade trimming apertures formed along a line that lies oblique to a marginal side edge of the second sheet blade, such that as the first sheet blade reciprocates against the second sheet blade, the plurality of first sheet blade trimming apertures and the plurality of second sheet blade trimming apertures alternately open and close creating a shearing action between an edge defining in part each of the plurality of first sheet blade trimming apertures and an edge defining in part each of the plurality of second sheet blade trimming apertures.

15. The trimmer of claim 14 wherein the blade head base further comprises a mesh screen positioned within the blade head base, the mesh screen configured to separate fines from trimmed leafage.

16. The trimmer of claim 14 further comprising a motor control for controlling an output speed of the motor and thereby controlling a speed at which the reciprocating motion between the first sheet blade and the second sheet blade.

17. The trimmer of claim 14 wherein the blade head further comprises a blade head configured to provide a first trimming configuration wherein the first sheet blade includes a concave surface and the first sheet blade is positioned above the second sheet blade to provide a concave trimming surface.

18. The trimmer of claim 8 further comprising:
the first sheet blade including a first sheet blade stem chopping aperture; and the second sheet blade including a second sheet blade stem chopping aperture, the first sheet blade stem chopping aperture and the second sheet blade stem chopping aperture configured to alternately align and displace with reciprocating action of second sheet blade against the stationary fixed first sheet blade, such that a stem that is inserted through the first sheet blade stem chopping aperture and the second sheet blade stem chopping aperture when aligned will be chopped when the first sheet blade stem chopping aperture and the second sheet blade stem chopping aperture displace with the reciprocating action of second sheet blade against the stationary fixed first sheet blade.

* * * * *